July 23, 1968 P. W. WARD 3,394,327

ELECTRIC SWITCHING ASSEMBLIES

Filed Aug. 10, 1966 4 Sheets-Sheet 1

INVENTOR
PETER WILLIAM WARD
BY Kurtz, Kurtz & Oltge
ATTORNEYS

July 23, 1968 P. W. WARD 3,394,327

ELECTRIC SWITCHING ASSEMBLIES

Filed Aug. 10, 1966 4 Sheets-Sheet 2

INVENTOR
PETER WILLIAM WARD
BY Kurt Kelman, Kurt Kelman & Oltzen
ATTORNEYS

July 23, 1968 P. W. WARD 3,394,327

ELECTRIC SWITCHING ASSEMBLIES

Filed Aug. 10, 1966 4 Sheets-Sheet 3

INVENTOR
PETER WILLIAM WARD
BY Kurt Kelman, Kurt Kelman and Ottinger
ATTORNEYS

ELECTRIC SWITCHING ASSEMBLIES

Filed Aug. 10, 1966 4 Sheets-Sheet 4

INVENTOR
PETER WILLIAM WARD
BY
[signature]
ATTORNEYS

United States Patent Office 3,394,327

Patented July 23, 1968

3,394,327

ELECTRIC SWITCHING ASSEMBLIES

Peter William Ward, Hatch End, England, assignor to The General Electric Company Limited, London, England, a British company Filed Aug. 10, 1966, Ser. No. 571,482
Claims priority, application Great Britain, Aug. 12, 1965, 34,584/65
19 Claims. (Cl. 335—112)

ABSTRACT OF THE DISCLOSURE

A matrix of relays, each having two "on" and one "off" position, is mounted on a printed circuit board so as to make selective interconnection between rows and columns of printed circuit conductors. Each relay interconnects a 4-wire (for example) input path with either one or neither (selectively) of two 4-wire output paths.

Figure 1:
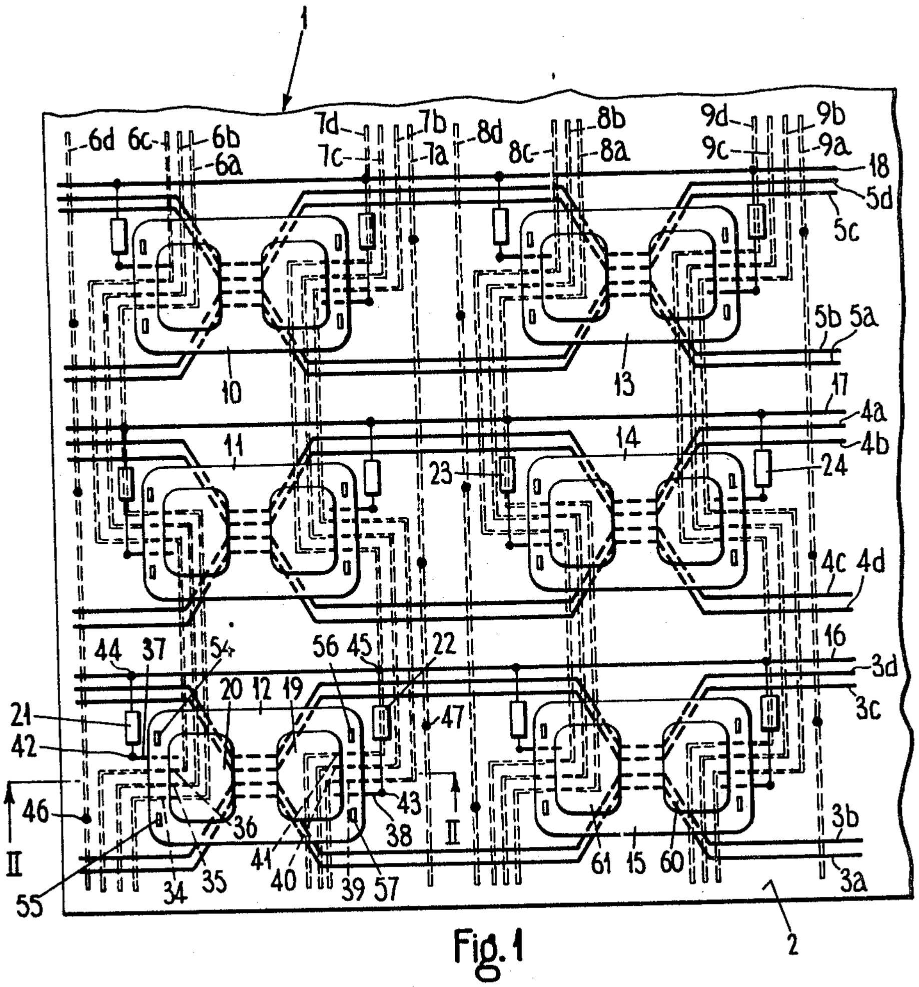

This invention relates to electric switching assemblies.

It is an object of the present invention to provide an improved electric switching assembly.

According to the present invention, in an electric switching assembly comprising a plurality of input paths each having a plurality of conductors, a plurality of output paths each having a plurality of conductors and a plurality of groups of electric contact units each associated with a different combination of one input path and one output path, the contact units of each group are arranged to make connections between corresponding conductors of the associated input path and output path respectively upon the actuation of that group and there are a plurality of electromagnetic relays that each provides two of said groups of contact units and an armature that is movable electromagnetically and selectively from a normal position in which neither of the two associated groups of contact units is actuated, to either one of two operated positions in each of which the armature causes the actuation of the contact units of a different one of the two associated groups.

Preferably said operated positions of each armature are on opposite sides of said normal position of that armature. Each of said relays may be arranged to connect a single input (or output) path selectively to one or other of two output (or input) paths.

Some, if not all, of said contact units may each be constituted by an electric contact member that is carried by an electric insulating member and an electric contact spring which is supported by a portion thereof being fixedly mounted relative to the insulating member and of which another portion is displaceable to make electric connection with the contact member.

The said contact members may comprise parts of a plurality of printed circuit conductors. (The term "printed circuit conductors" used herein refers to electrical conductors formed as a metallic pattern on an insulating substrate, and it is not intended that this term be limited to the case in which the metallic pattern is obtained by an actual printing process.)

The said contact springs may be connected electrically to a further plurality of printed circuit conductors.

Both pluralities of printed circuit conductors may be formed on the same insulating member. In this respect, one plurality of printed circuit conductors may all extend generally in the same direction across one surface of a board of insulating material and the other plurality of printed circuit conductors may all extend generally in the same direction but substantially at right angles to the first said plurality of printed circuit conductors across the opposite surface of this board.

The input paths and the output paths may each be associated with more than one of the groups of electric contact units.

Each said contact member may be common to two of the said contact springs that are each in a different one of the groups of contact units that are controlled by the same relay armature.

Each said relay may have two energising windings and may be arranged so that each of said two operated positions of its armature is attained in response to the energising of a different one of these two windings with direct current of suitable magnitude.

Each said relay may have an electromagnet assembly which is mounted on the same insulating member as the said contact members and the said contact springs of that relay.

This insulating member may comprise a board of electrical insulating material which is common to some, if not all of the said relays of the switching assembly.

Two embodiments of electric switching assemblies in accordance with the present invention will now be described, by way of example, with reference to the five figures of the accompanying drawings in which:

FIGURE 1 is a plan view of part of the first switching assembly to be described.

Figure 2:
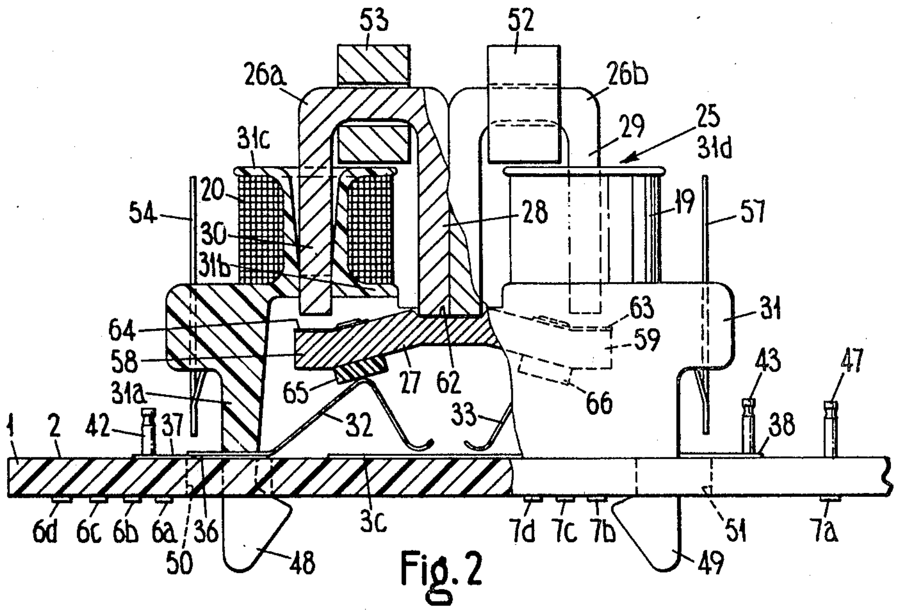
Figure 5:
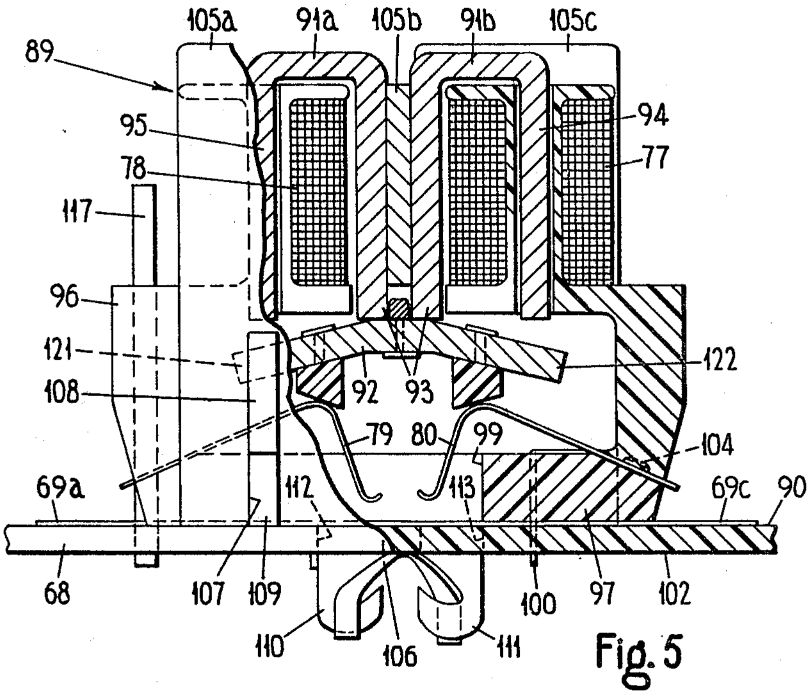
Figure 3:
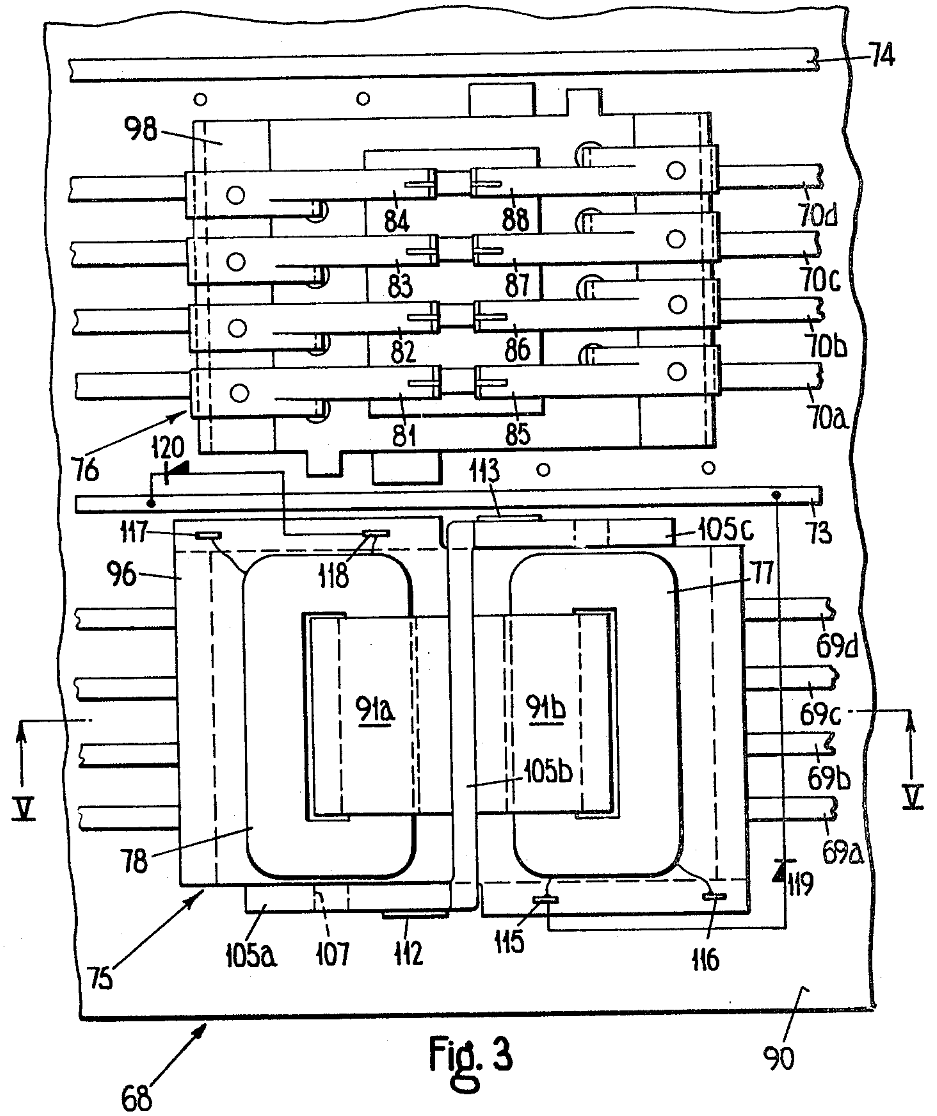
Figure 4:
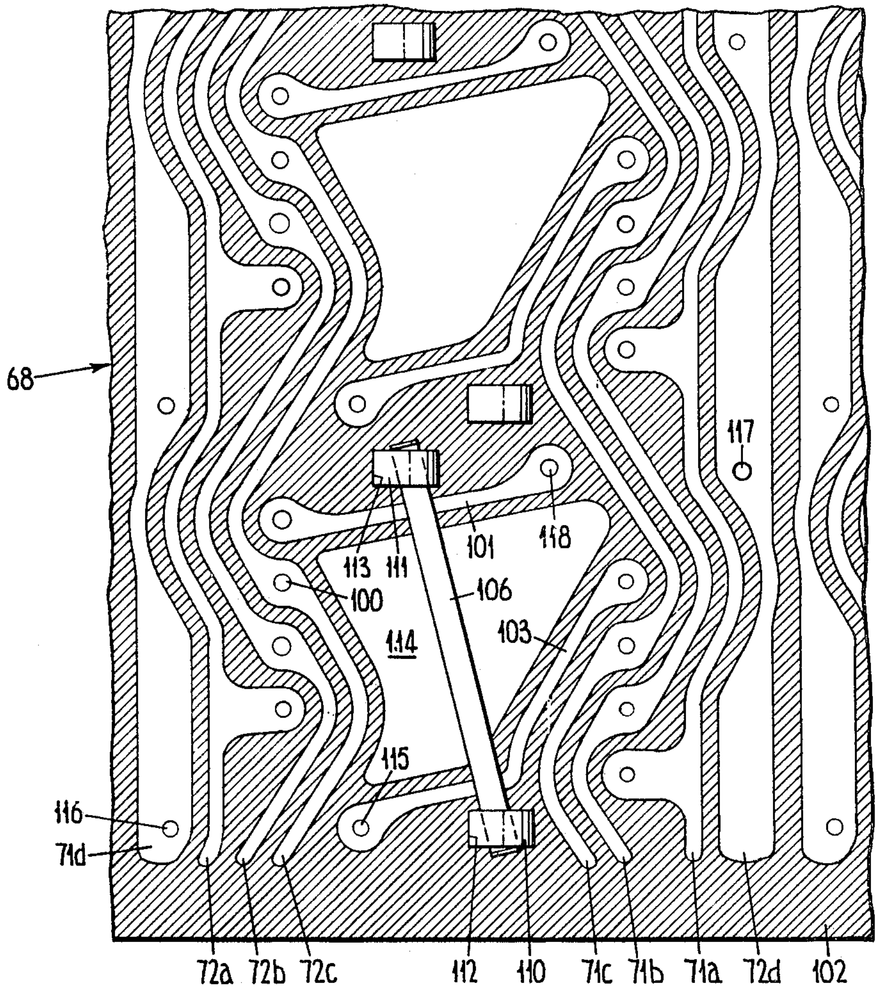

FIGURE 2 is a side elevation, partly in section, of an electromagnetic relay which is employed in the switching assembly of FIGURE 1, FIGURES 3 and 4 respectively show top and underneath plan views of part of the second switching assembly to be described, and FIGURE 5 is a side elevation, partly in section at the line V—V in FIGURE 3, of an electromagnetic relay which is employed in the switching assembly of FIGURES 3 and 4.

In each of the switching assemblies to be described, a generally rectangular board of electrical insulating material carries ten input paths which each comprises four printed circuit conductors on the top surface of the board, a further ten printed circuit conductors on the said top surface of the board, one for each input path, ten output paths which each comprises four printed circuit conductors on the under surface of the board and fifty electromagnetic relays which are arranged in a matrix of five columns and ten rows on the said top surface of the board. The ten input paths are associated with the ten rows of relays respectively and the five pairs of adjacent output paths are associated with the five columns of relays respectively.

Each of the said relays is arranged, as will be hereinafter described, so that in each of two operated states of that relay a different one of the two associated output paths has its four conductors connected to the four conductors respectively of the associated input path, and so that in the non-operated state of that relay such connections do not exist.

Reference now should be made to FIGURE 1 which shows part of the first switching assembly to be described. This part comprises one corner of the board 1 of insulating material, portions of the printed circuit conductors *3a* to *3d*, *4a* to *4d* and *5a* to *5d* of three input paths 3, 4 and 5 on the top surface 2 of the board 1, portions of the printed circuit conductors *6a* to *6d*, *7a* to *7d*, *8a* to *8d* and *9a* to *9d* of four output paths 6, 7, 8 and 9, the six relays 10, 11, 12, 13, 14 and 15 that are associated with both the input paths 3, 4 and 5 and the pairs of output paths 6, 7; and 8, 9 and portions of the three printed circuit conductors 16, 17 and 18 that are associated with the input paths 3, 4 and 5 respectively.

The said two operated states of each relay, for example, the relay 12, are each obtained by energising a different one of two windings 19 and 20 of that relay with direct current of suitable magnitude. As will be hereinafter described, the winding 19 controls the making of connections between the conductors 3*a* to 3*d* and the conductors 6*a* to 6*d* while the winding 20 controls the making of connections between the conductors 3*a* to 3*d* and the conductors 7*a* to 7*d*.

The relays of this switching assembly, such as the relays 10 to 15, are identical, the construction of the relay 12 being illustrated, by way of example, in FIGURE 2 to which reference now should also be made. This relay 12 has an electromagnet assembly 25 which is detachably mounted on the board 1 and which incorporates a generally E-shaped ferromagnetic core 26, an armature 27 arranged to pivot on the centre limb 28 of the core 26, the windings 19 and 20 which embrace the two outer limbs 29 and 30 of the core, and a housing 31 which carries the core and the windings. The armature 27 spans and normally is supported adjacent its two ends 58 and 59 by two groups of contact springs respectively which hold the armature in engagement with the end of the centre limb 28 of the core 26 and of which only the contact spring 32 of one group and the contact spring 33 of the other group can be seen. Each group comprises four identical contact springs which are parallel to one another and side-by-side. The armature 27 has a shallow channel 62 across one face mid-way between its ends, this channel co-operating with the end of the centre limb 28 of the core 26 to locate the armature. The armature is shaped so that normally its two ends 58 and 59 are adjacent to and substantially equidistant from the ends of the outer limbs 30 and 29 respectively of the core 26. Strips 63 and 64 of electrical insulating material are provided across the ends 58 and 59 of the armature 27 to prevent these ends actually engaging the ends of the outer limbs 29 and 30 when the armature pivots. Actual engagements between the armature 27 and the two groups of contact springs having the contact springs 32 and 33 are prevented by two bars 65 and 66 of electrical insulating material that are attached to the armature.

Each contact spring of the group including the contact spring 32 has one end held by one or more rivets (not shown) in intimate engagement with a different one of four isolated conductor areas 34, 35, 36 and 37 formed on the top surface 2 of the board 2. Each contact spring of the group including the contact spring 33 similarly has one end held in intimate engagement with a different one of another four isolated conductor areas 38, 39, 40 and 41 formed on the surface 2. The four contact springs of one group are alined with the four contact springs respectively of the other group and have their free ends adjacent to the free ends of the contact springs of this other group.

The three contact springs which engage the conductor areas 34, 35 and 36 are connected through the board 1 by their rivets (not shown) to the conductors 6*a*, 6*b* and 6*c* respectively of the output path 6. Similarly the three contact springs which engage the conductor areas 39, 40 and 41 are connected through the board 1 to the conductors 7*b*, 7*c* and 7*d* respectively of the output path 7. Two terminal pins 42 and 43 are mounted on the board 1 so as to be in intimate engagement with the conductor areas 37 and 38 respectively. Another two terminal pins 44 and 45 are mounted on the board 1 so as to be in intimate engagement with the conductor 16. Two further terminal pins 46 and 47 are mounted on the board 1 so as to be in intimate engagement with the conductors 6*d* and 7*a* respectively. All the terminal pins 42 to 47 project from the top surface 2 of the board 1.

The housing 31 is moulded from an electrical insulating material such as the acetal resin sold under the registered trade mark "Delrin." This housing is in the form of a generally rectangular box 31*a* which is closed *at* one end by a wall 31*b* and which has two spaced bobbins 31*c* and 31*d* for the windings 19 and 20 formed on this wall. The housing 31 is detachably mounted on the board 1 so that this board closes the open end of the box 31*a*. Thus four lugs, such as the lugs 48 and 49, at the four corners of the box 31*a* are sprung into locating holes in the board 1, such as the holes 50 and 51. The core 26 comprises two generally U-shaped stampings 26*a* and 26*b* formed from metal strip comprising an alloy of 45% nickel and 55% iron. The three limbs 28, 29 and 30 of the core 26 are tight fits in apertures through the bobbins 31*c* and 31*d* and the wall 31*b* of the housing 31. The end faces of these limbs 28, 29 and 30 all lie in substantially the same plane and are just proud of the surface of the wall 31*b* that is inside the box 31*a*. The portions of the core 26 that are between the limbs 28 and 29 and between the limbs 28 and 30 are embraced by copper rings 52 and 53 respectively.

The winding 19 at one end of the housing 31 is connected between two terminal pins 54 and 55 which are moulded in the opposite end of that housing. Similarly the winding 20 is connected between two terminal pins 56 and 57. The terminal pins 54 and 55 are directly connected to the terminal pins 42 and 46 respectively while the terminal pins 56 and 57 are directly connected to the terminal pins 47 and 43 respectively. A rectifier element 21 is connected between the terminals 42 and 44 so as to be in series with the winding 19 in a circuit which extends from the conductor 6*d* to the conductor 16. A rectifier element 22 is connected between the terminals 43 and 45 and thus is in series with the winding 20 in a circuit which extends from the conductor 7*a* to the conductor 16. The rectifier elements 21 and 22 are each poled so as to present a low impedance to conventional current flow from its associated one of the conductors 6*d* and 7*a* to the conductor 16.

When it is required to make connections between the conductors of any one of the input paths, for example, the input path 3 and the conductors of any one of the output paths, for example, the output path 7, a suitable direct current supply is connected between the conductor 16 associated with this input path 3 and the conductor 7*a* of this output path 7 so that these conductors 16 and 7*a* are at relatively negative and positive voltages respectively. Thus the winding 20 is energised via the rectifier element 22, the other rectifier elements, such as the rectifier elements 23 and 24 preventing current flow from this supply through any of the other relay windings. Upon the energisation of the winding 20, the adjacent end 58 *of* the armature 27 is attracted to the outer limb 30 of the core 31 and the armature pivots on the centre limb 28 of that core. Consequently the other end 59 of the armature 27 moves towards the board 1 thereby causing the group of contact springs including the contact spring 33 to make connection with the conductors 3*a* to 3*d* of the input path 3. In this way direct connections are made between the conductors 3*b*, 3*c* and 3*d* of the input path 3 and the conductors 7*b*, 7*c* and 7*d* respectively of the output path 7 while the winding 20 is connected directly between the conductors 3*a* and 7*a*. This last mentioned connection enables the winding 20 to be energised independently of the conductor 16 so as to make this conductor available for use in selectively energising any other one of the associated windings such as the windings 60 and 61 of the relay 15.

The energy stored by the deflected contact springs 33 serves to restore the armature 27 to its normal position, as shown in FIGURE 2, when the supply of energising current to the winding 20 is discontinued. The copper rings 52 and 53 are provided to retard the decay of magnetic flux in the outer limbs 29 and 30 of the core 26 that occurs upon the de-energisation of the windings 19 and 20 respectively. In this way the armature 27 is damped during restoration so that it cannot sufficiently overshoot the normal position to cause the engagement of the conductors 3*a* to 3*d* by the other group of contact springs.

It will be appreciated that in each relay, for example, the relay 12, the armature 27 has two operated positions which are on opposite sides of its normal position and in each of which a different one of the two groups of contact springs is deflected into engagement with the conductors 3*a* to 3*b* of the input path 3.

The end of the centre limb 28 of the core 26 may be bevelled (not shown) or the channel 62 across the armature 27 may be shaped so that when that armature is moved into either of its operated positions, engagement with this centre limb is maintained over an appreciable surface area of the armature. This ensures that the magnetic reluctance betwen the armature 27 and the centre limb 28 of the core 26 does not increase appreciably when the armature is moved from said normal position to either operated position.

Reference now should be made to FIGURES 3 and 4 which respectively show top and underneath views of part of the second switching assembly to be described. This part comprises a portion of the board 68 of insulating material, portions of the printed circuit conductors 69*a* to 69*d* and 70*a* to 70*d* of two input paths 69 and 70, portions of the printed circuit conductors 71*a* to 71*d* and 72*a* to 72*d* of one pair of adjacent output paths 71 and 72, portions of printed circuit conductors 73 and 74 which are associated with the input paths 69 and 70 respectively, the relay 75 which is associated with the input path 69 and the output paths 71 and 72 and part of the relay 76 which is associated with the input path 70 and the output paths 71 and 72. (In FIGURE 3 the relay 76 is illustrated with its electromagnet assembly removed so as to show the contact springs.)

The said two operated states of each relay, for example the relay 75, are each obtained by energising a different one of two windings 77 and 78 of that relay with direct current of suitable magnitude. The winding 77 controls the making of connections between the conductors 69*a* to 69*d* and the conductors 71*a* to 71*d* while the winding 78 controls the making of connections between the conductors 69*a* to 69*d* and the conductors 72*a* to 72*d*.

The relays of this switching assembly are identical, their construction being illustrated in FIGURE 3 and also in FIGURE 5 to which reference now should also be made and which represents the relay 75. Each relay has two groups of four identical contact springs of which only the contact springs 79 and 80 of the two groups of the relay 75 can be seen (FIGURE 5). The contact springs 81, 82, 83 and 84 and the contact springs 85, 86, 87 and 88 of the two groups of the relay 76 are shown in FIGURE 3. Each relay, for example, the relay 75 also has an electromagnet assembly 89 which is detachably mounted on the top surface 90 of the board 68 and which incorporates a generally E-shaped ferromagnetic core 91, an armature 92 arranged to pivot on the centre limb 93 of this core, the windings 77 and 78 which embrace the two outer limbs 94 and 95 of this core, and a housing 96 which carries the core and the windings.

The relay 75 differs from the relay 12 described above with reference to FIGURES 1 and 2 in the following respects:

A generally rectangular plate 97 of electrical insulating material stands on the top surface 90 of the board 68 and supports the housing 96. The corresponding plate 98 of the relay 76 is illustrated in FIGURE 3. Each of the contacts springs such as the contact springs 79 and 80 has one end clamped between the plate 97 and the housing 96 and has its other end extending into an aperture 99 through the plate. Each contact spring, for example, the contact spring 80 has a tongue portion 100 that extends through alined apertures in the plate 97 and the board 68 and is connected electrically to one conductor 72*c* of the output path 72 that is associated with its group of contact springs. In this way, the four contact springs of the group including the contact spring 80 are connected to the conductors 72*a*, 72*b*, 72*c* and a further printed circuit conductor 101 respectively on the under surface 102 of the board 68. Similarly, the four contacts springs of the group including the contact spring 79 are connected to the conductors 71*a*, 71*b*, 71*c* and a further printed circuit conductor 103 respectively on the surface 102. The contact spring 80, like every other contact spring of the relay 75, co-operates with a locating stud 104 formed on the plate 97. The conductors 69*a*, 69*b*, 69*c* and 69*d* extend across the board 68 and under the plate 97 so that each passes immediately under but at a distance from the free end of a different one of the four contact springs of each group. Thus the conductor 69*c* passes under the contact springs 79 and 80.

The housing 96 and the plate 97 are located and held on the board 68 by a bracket 105 of mild steel and a spring strip 106. Each of the end arms 105*a* and 105*c* of this bracket, for example, the end arm 105*a*, is formed with a slot 107 into which extend outwardly projecting parts 108 and 109 of the housing 96 and the plate 97 respectively. These end arms 105*a* and 105*c* are provided with hook shaped lugs 110 and 111 which extend through apertures 112 and 113 in the board 68. The spring strip 106 engages with these lugs 110 and 111 and with a printed conductor area 114 on the under surface 102 of the board 68 to hold the bracket 105 and hence the housing 96 and the plat 97 in position. The core 91 comprises two generally U-shaped stampings 91*a* and 91*b* which are welded to the cross-arm 105*b* of the bracket 105. These stampings 91*a*, 91*b* and the armature 92 are of the nickel iron alloy known as permalloy-B.

The winding 77 is connected between an adjacent pair of terminal pins 115 and 116 which are moulded in the housing 96. Similarly the winding 78 is connected between a pair of terminal pins 117 and 118 which are moulded in the housing 96. These terminal pins 115, 116, 117 and 118 pass through four apertures in the board 68 that extend through the conductors 103, 71*d*, 72*d* and 101 respectively and have their ends soldered or otherwise connected electrically to these conductors. The terminal pins 115 and 118 also are connected via individual rectifier elements 119 and 120 to the conductor 73. Each of these rectifier elements 119 and 120 is poled to present a low impedance to conventional current flow from its associated one of the terminal pins 115 and 118 to the conductor 73.

When it is required to make connections between the conductors of any one of the input paths, for example, the input path 69, and the conductors of any one of the output paths, for example, the output path 72, a suitable direct current supply is connected between the conductor 73 associated with this input path 69 and the conductor 72*d* of this output path so that these conductors are at relatively negative and positive voltages respectively. Thus the winding 78 is energised via the rectifier element 120 thereby causing the adjacent end 121 of the armature 92 to be attracted to the outer limb 95 of the core 91 and the armature to pivot on the end of the centre limb 93 of that core. The other end 122 of the armature 92 moves towards the board 68 thereby deflecting the group of contact springs including the contact spring 80 into engagement with the conductors 69*a* to 69*d* of the input path 69. Thus direct connections are made between the conductors 69*a*, 69*b* and 69*c* and the conductors 72*a*, 72*b* and 72*c* while the winding 78 is connected directly between the conductors 69*d* and 72*d*. The last mentioned connection enables the winding 78 to be energised independently of the conductor 73 so as to make this conductor available for use in selectively energising either winding of any other relay (not shown) in the same row as the relay 75.

The energy stored in the deflected contact springs serves to restore the armature 92 to its normal position when the supply of energising current to the winding 78 is discontinued. If desired, the armature 92 may be damped electromagnetically during restoration by means of copper rings (not shown) around the two parts 91*a* and 91*b* of the core 91.

The relays, such as the relays 12 and 75 of the two switching assemblies described above form the subject matter of our co-pending patent application Ser. No. 571,-551 filed Aug. 10, 1966.

The function of the rectifier elements such as the rectifier elements 21, 22, 23 and 24 in FIGURE 1 and the rectifier elements 119 and 120 in FIGURE 3 is to prevent the simultaneous energisation of windings of two or more of the relays 10 to 15 or 75, 76 of their switching assemblies. This function could be performed by providing make contact units of further electromagnetic relays (not shown) in place of these rectifier elements although preferably further conductors (not shown), corresponding to the conductors 16, 17, 18 in FIGURE 1 and the conductors 73 and 74 in FIGURE 3, then are provided one for each input path and the two windings of each relay are connected via two such contact units (not shown) to the associated one of the conductors 16, 17, 18 or 73, 74 and the corresponding one of said further conductors respectively.

I claim:

1. An electric switching assembly comprising a plurality of input paths, a plurality of output paths, a plurality of input conductors in each input path, a plurality of output conductors in each output path, a plurality of contact groups that are each associated with a different combination of one input path and one output path, a plurality of electric contact units in each contact group which are connected between corresponding conductors of the input path and output path respectively that are associated with that contact group and which are adapted to make electric connections between these conductors upon their actuation, a plurality of electromagnetic relays which each incorporates two of said contact groups, an armature in each relay having a normal position in which neither contact group of that relay has its contact units actuated and also having two operated positions in each of which that armature causes the actuation of the contact units of a different one of the two associated contact groups, and electromagnet means in each relay for moving the associated armature selectively from said normal position to either one of said two operated positions.

2. An electric switching assembly assording to claim 1 wherein both contact groups of any relay have their contact units connected to the conductors of the same path of one of the two said pluralities of paths.

3. An electric switching assembly according to claim 1 wherein the conductors of each input path and of each output path are connected to the contact units of more than one contact group.

4. An electric switching assembly according to claim 3 wherein the relays are arranged in columns and rows to form a matrix, wherein the contact units in the contact groups which belong to any row of relays are connected to the conductors of the same path of one of the two said pluralities of paths, and wherein the contact units in corresponding contact groups of any column of relays are connected to the conductors of the same path of the other one of the two said pluralities of paths.

5. An electric switching assembly according to claim 1 wherein each contact unit comprises an electric contact member and an electric contact spring of which a portion is displaceable to make electric connection with that contact member.

6. An electric switching assembly according to claim 5 wherein each contact member is common to two of the contact springs that are each in a different one of the two contact groups of the relay incorporating that contact member.

7. An electric switching assembly according to claim 5 wherein there are a plurality of printed circuit conductors and wherein the contact members comprise parts of these printed circuit conductors.

8. An electric switching assembly according to claim 7 wherein said printed circuit conductors comprise the conductors of one of the two said pluralities of paths.

9. An electric switching assembly according to claim 8 wherein there is a board of electrical insulating material on which said printed circuit conductors are formed and wherein the electromagnet means of each relay is mounted on this board.

10. An electric switching assembly according to claim 9 wherein there are a plurality of mounting means which each carries the electromagnet means of a different one of the said relays and which each is detachably mounted on the said board.

11. An electric switching assembly according to claim 9 wherein a portion of each contact spring of the contact units is fixedly mounted relative to the said board to support that contact spring.

12. An electric switching assembly according to claim 11 wherein a further plurality of printed circuit conductors are formed on the said board and wherein the contact springs are connected electrically to these further printed circuit conductors.

13. An electric switching assembly according to claim 12 wherein the further plurality of printed circuit conductors comprise the conductors of the other one of the two said pluralities of paths.

14. An electric switching assembly according to claim 13 wherein one plurality of printed circuit conductors all extend generally in the same direction across one surface of the said board and wherein the other plurality of printed circuit conductors all extend across the opposite surface of the said board and generally at right angles to the first said plurality of printed circuit conductors.

15. An electric switching assembly according to claim 3 wherein the electromagnet means of each relay includes a first energising winding for controlling movement of the relay armature from its normal position to one of its operated positions and a second energising winding for controlling movement of that armature from its normal position to the other one of its operated positions.

16. An electric switching assembly according to claim 15 wherein a plurality of further conductors are associated with the plurality of input paths respectively and wherein each winding is connected between the further conductor and one output conductor of the associated input path and output path.

17. An electric switching assembly according to claim 16 wherein a plurality of isolating means are connected in series with the plurality of winding respectively to prevent the energising current for any winding also flowing through any other winding.

18. An electric switching assembly according to claim 17 wherein each isolating means comprises a rectifier element.

19. An electric switching assembly according to claim 16 wherein each winding also is connected in series with one contact unit of the contact group controlled by that winding between said one output conductor of the associated output path and the corresponding input conductor of the associated input path.

References Cited

UNITED STATES PATENTS

| | | | |
|---|---|---|---|
| 2,702,841 | 2/1955 | Bernstein | 200—166 |
| 2,790,875 | 4/1957 | Bancroft | 200—166 |

BERNARD A. GILHEANY, *Primary Examiner.*

H. BROOME, *Assistant Examiner.*